United States Patent
Lemmens

[15] 3,641,843
[45] Feb. 15, 1972

[54] VARIABLE-SPEED TRANSMISSION

[72] Inventor: Joseph Lemmens, 616 Boisvert Street, #6, St. John, Quebec, Canada

[22] Filed: Sept. 22, 1969

[21] Appl. No.: 859,689

[52] U.S. Cl. .............................................. 74/751, 74/689
[51] Int. Cl. .................................... F16h 33/02, F16h 37/02
[58] Field of Search .......................... 74/751, 689, 230.17 A

[56] References Cited

UNITED STATES PATENTS

| | | | |
|---|---|---|---|
| 2,387,609 | 10/1945 | Reeves | 74/230.17 A |
| 874,580 | 12/1907 | Farkas et al. | 74/751 X |
| 1,335,249 | 3/1920 | Leymarie | 74/751 X |
| 1,956,078 | 4/1934 | Mueller | 74/751 |
| 2,164,818 | 7/1939 | Heyer et al. | 74/689 |
| 2,196,064 | 4/1940 | Erban | 74/689 X |
| 2,525,946 | 10/1950 | Roberts | 74/751 |
| 2,803,151 | 8/1957 | Clerk | 74/751 |
| 2,933,952 | 4/1960 | Schou | 74/689 |

*Primary Examiner*—Carlton R. Croyle
*Assistant Examiner*—Thomas C. Perry
*Attorney*—Pierre Lesperance

[57] ABSTRACT

Various applications or embodiments of a variable speed transmission concept wherein a variable speed drive and a proportional speed drive are operatively connected to a differential gear arrangement, such that variation of the speed ratio of the variable speed drive causes variation of the speed of an output shaft connected to the differential gear arrangement, said variable speed drive comprising a pair of variable diameter pulleys operatively interconnected by a belt. The variable speed transmission is combined with a flywheel to conserve and/or recuperate energy.

6 Claims, 7 Drawing Figures

INVENTOR
Joseph LEMMENS

Fig.7

VARIABLE-SPEED TRANSMISSION

The present invention relates to a variable-speed transmission and, more particularly, to a variable-speed transmission combining a proportional speed drive with a variable-speed drive.

The efficiency of the presently existing transmissions is relatively limited on account of high friction and complexity, the difficulty to operate at the optimum rotational speed of the motor and substantial loss of energy when braking, operating at low speed or declutched.

It is an object of this invention to provide a variable speed transmission that has relatively high efficiency.

Another object of this invention is to provide a variable speed transmission having a proportional-speed drive input and a variable speed drive input to a differential.

A further object of the invention is to provide a variable-speed transmission having neutral, forward and reverse speeds.

Another object of the invention is to provide a variable-speed transmission applicable substantially to any type of vehicle or machinery requiring declutching and variable speed.

Still a further object of the invention is to provide a variable-speed transmission combined with a flywheel to conserve and/or recuperate the energy.

A more specific object of the invention is to provide a variable-speed transmission combining the relatively high efficiency of a positive drive to the relatively high versatility of a variable-speed belt drive.

Other objects and advantages of the variable-speed transmission of the present invention will become apparent from the following specification and appended drawings, wherein like reference characters indicate like parts throughout the various figures in which.

Figure 1:
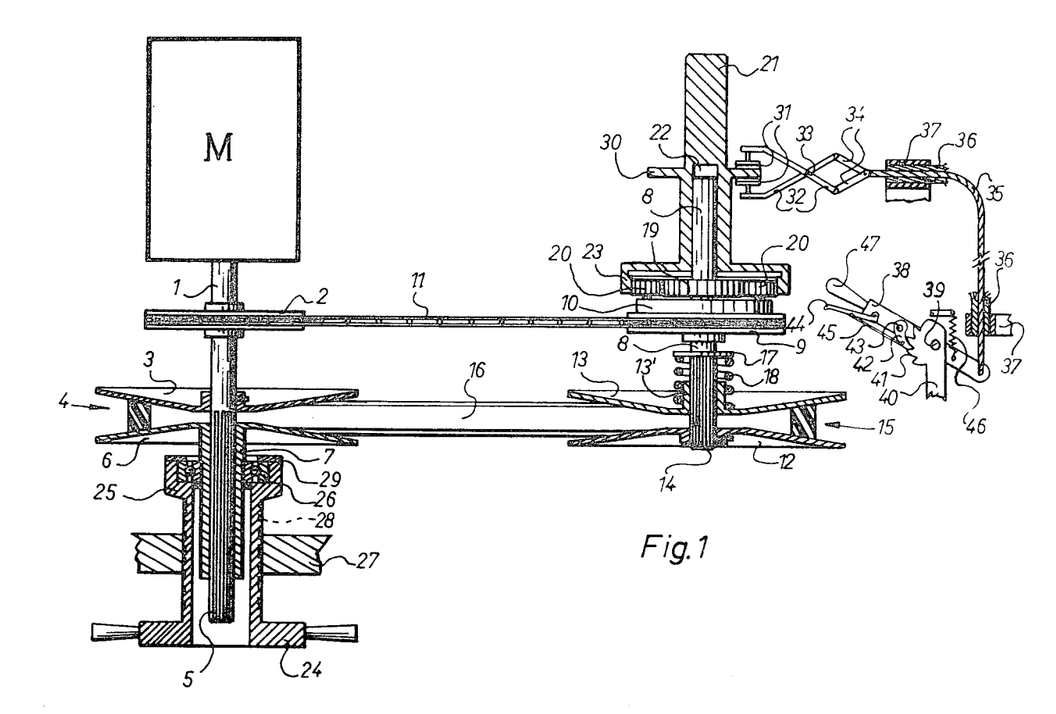
FIG. 1 is a cross-sectional view of one embodiment of the invention particularly adapted to provide a dynamic neutral.

Referring now in detail to the drawings and particularly to FIG. 1, there is shown a motor M actuating an input shaft 1, on which are fixedly mounted a sprocket wheel 2 and a flange 3 of a variable diameter pulley 4. The free end of the input shaft 1 terminates into a splined portion 5 adapted to receive the second flange 6 of the variable diameter pulley 4. The hub 7 of the flange 6 has a splined bore adapted to slidingly cooperate with the splines of the end portion 5 such that the flange 6 is movable longitudinally of the input shaft 1.

A driven shaft 8 is arranged parallel to the input shaft 1 and a sprocket wheel 9 is mounted on the drive shaft 8 for rotation relative thereto.

A planet gear carrier 10 is attached to the sprocket wheel 9 for rotation therewith. The sprocket wheels 2 and 9 are aligned and a chain 11 is operatively connected between said sprocket wheels 2 and 9.

A flange 12 is fixedly mounted on the driven shaft 8 such as to be retained thereon against axial displacement.

A flange 13 is provided adjacent the flange 12 to define a variable diameter pulley 15. The flange 13 is provided with a hub 13' having a splined bore adapted to slidingly engage a splined portion 14 of the shaft 8 for longitudinal displacement along the latter.

A belt 16 extends around the aligned pulleys 4 and 15. A circular flange 17 is axially retained on shaft 8 at a distance from the movable flange 13. A spring 18 is coiled around shaft 8 between the circular flange 17 and the movable flange 13, such as to bias the latter toward the fixed flange 12.

As is well known in the art of variable diameter pulleys, the pulley flanges of each pair are conically shaped such as to wedge the belt radially outwardly thereof upon the flanges approaching each other. It must also be noted that the movable flanges 6 and 13 must be located on opposite sides of the belt 16 in order to maintain alignment of the latter.

A sun gear 19 is fixed on the driven shaft 8 for rotation therewith. A pair of planet gears 20 are mounted on the planet carrier 10 for rotation therewith. An output shaft 21 has an axial bore 22 at one end thereof, adapted to rotatably mount the output shaft 21 on one end of the driven shaft 8. The end of the output shaft 21 which surrounds the driven shaft 8 has a ring gear 23 formed thereon. The ring gear 23, the planet gears 20 and the sun gear 19 are intermeshing in the well known and usual manner for such planetary gear train.

In order to vary the speed ratio of the variable pulley drive, there is provided a control comprising a control knob 24 having a sleeve portion 25 concentrically mounted around the input shaft 1.

A thrust bearing 26 is inserted between the extended hub 7 and the cylindrical portion 25 such that the flange 6 of the pulley 4 is rotatable relative to the control knob. The axial movement of the knob 24 relative to the fixed flange 3 is made possible by mounting the sleeve portion 25 in a splined opening in a support 27. The sleeve 25 is provided with splines 28 adapted to cooperate with a threaded bore in the support 27, such that rotation of the control knob 24 will cause axial displacement of the flange 6. Locking rings 29 are provided in order to lock the bearing 26.

A brake mechanism is provided to brake the output shaft 21 by frictionally clamping the circular flange 30 surrounding the output shaft 21. The brake mechanism proper comprises a pair of brakeshoes 31 mounted on scissor links 32 pivoted to each other at 33. Two actuating links 34 are pivoted at one end to the scissor links 32 and at the other end to one extremity of a Bowden wire cable 35. The sheathing 36 of the cable 35 is firmly held in fixed position by means of two brackets 37. The other extremity of the cable 35 is attached at one end of a brake actuating lever 38, which is pivoted at 39 on a support 40.

Ratchet teeth 41 are provided on the support 40 in cooperation with a pawl 42, which is pivoted at 43 on the brake actuating lever 38. A release lever 44 is pivoted on the brake lever 38 adjacent the handle thereof and a rod 45 interconnects the release lever 44 to the pawl 42 such as to release the brake. A tension spring 46 is connected between the brake actuating lever 38 and the fixed support 40 to maintain pawl 42 in engagement with a ratchet tooth 41.

In operation, the motor M rotates the shaft 1, the sprocket 2 and the pulley 4 fixed thereto. The rotation of the pulley 4 rotates the belt 16 and the pulley 15, thereby causing rotation of the driven shaft 8 and the sun gear 19 fixed thereto. In turn, the rotation of the sprocket 2 causes rotation of the chain 11, the sprocket 9 and the planet carrier 10, resulting in rotation of the planet gears 20 around the sun gear 19.

Depending on the relative sizes of the gears in the planetary gear train and the relative speeds of rotation of the sun and planet gears, the ring gear 23 and the attached output shaft 21 are rotated in forward, reverse or are held stationary.

The range of speed of the output shaft and the dynamic neutral are functions of the relative sizes of the gears and the speed ratios of the variable diameter pulleys. Also, the relative diameters of the gears are limited by the speed ratios of the variable pulley drive. The variable-speed drive determined by the belt and pulleys produces variation of the angular speed of the sun gear relative to the planet gears.

A dynamic neutral can be obtained by rotation of the control wheel 24 to vary the spacing between the flanges 3 and 6 and thereby increase or decrease the diameter of the pulley 4 until the output shaft stops rotating. The increase or decrease in diameter of pulley 4 either tightens or releases the tension of the belt 16 in the throat of the pulley 15, resulting in displacement of the movable flange 13 to restore equilibrium between the action of the belt 16 and the spring 18.

It has been calculated for example that if the diameter of the sun gear 19 is twice the diameter of the planet gears 20 and the variable-speed drive is caused to produce a speed of the sun gear which is three times that of the planet gears, the ring gear does not in principle rotate and a dynamic neutral is obtained. In practice, an absolutely nul speed is difficult to obtain dynamically, since slight negative and positive speeds of the ring gear 23 and the output shaft 21 usually result. The brake is provided to make sure that the output shaft 21 is really and absolutely not rotating. It is estimated that a gear ratio of one-half results in a belt speed equal to 75 percent of its maximum, while for a gear ratio of three-fourths, the belt has a speed equal to 58 percent of its maximum when the transmissions are adjusted to dynamic neutral.

It has been determined that the efficiency of the above-described transmission is better than the efficiency of a transmission merely using variable pulleys. This appears to be logical since 50 to 90 percent of the power transmitted by the transmission passes through a positive mechanical drive.

Figure 2:
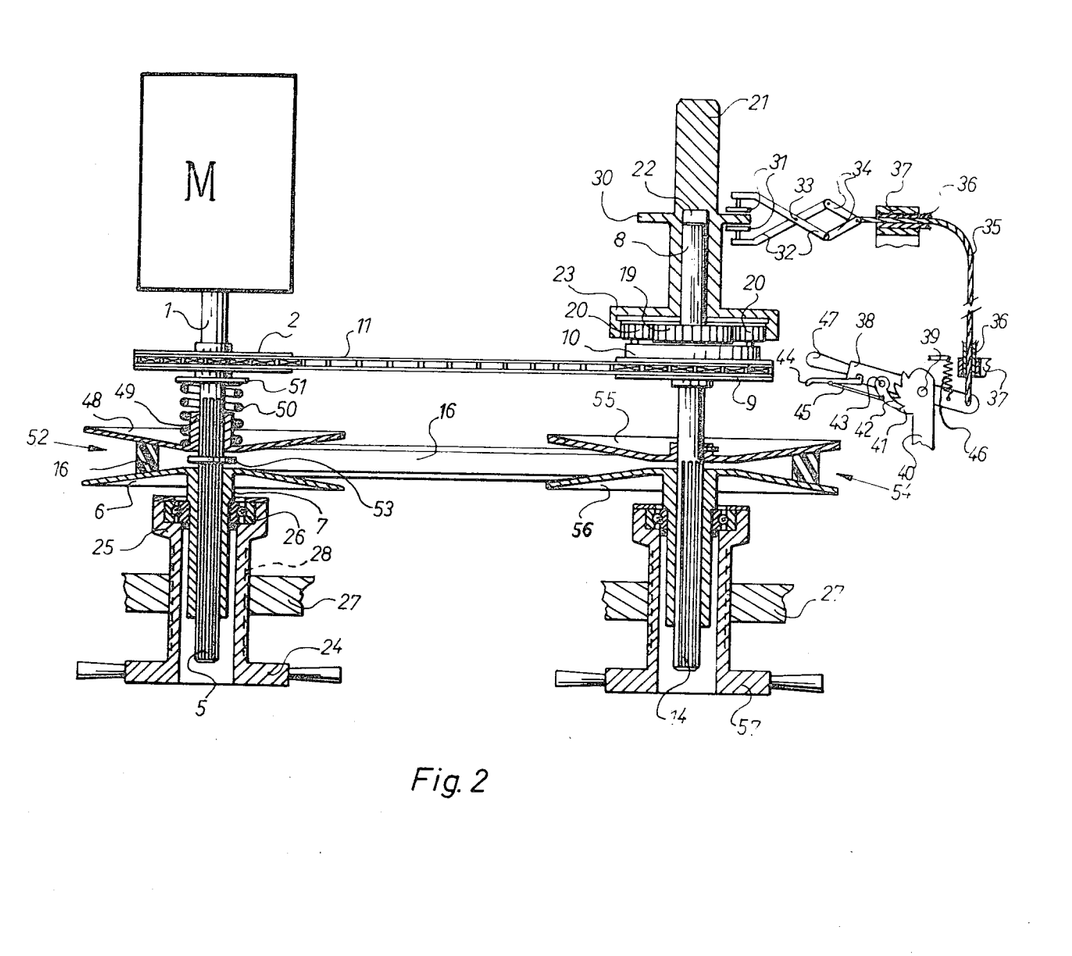
FIG. 2 is a cross-sectional view of another embodiment of the invention particularly adapted for a dynamic and a static neutrals.

FIG. 2 shows another embodiment of the invention which is particularly adapted for industrial use and wherein a second control wheel is provided in order to cause the pair of variable pulleys to completely disengage the belt 16 by spreading apart the flanges of the two pulleys. The elements which are common to FIGS. 1 and 2 and which are similarly arranged, bear the same reference characters in FIG. 2 as in FIG. 1. In FIG. 2, the pulley on the input shaft 1 comprises a movable flange 48 having a hub 49 provided with a splined bore therethrough.

A compression spring 50 is coiled around the hub 49 and the input shaft 1 in abutment at one end against a flange 51 fixed to the input shaft 1, and at its other end against the outside surface of the movable flange 48. The splined portion 5 of the input shaft 1 extends in cooperation with the splined bore of the hub 49, such as to provide for the flange 48 to slide along the input shaft 1 in rotatable association therewith.

In FIG. 2, the movable flange 48 cooperates with the already described movable flange 6 to form the pulley 52. A circular flange 53 is provided on the input shaft 1, intermediate the flanges 6 and 48 such as to limit the excursion of the latter along said input shaft 1.

A pulley 54 on the driven shaft 8 comprises a fixed flange 55 and a movable flange 56 mounted on the splined portion 14 in exactly the same manner as flange 6 of FIGS. 1 and 2. A control wheel 57 is mounted the same way as the control wheel 24 in order to vary the throat of the pulley 54.

The operation of the transmission of FIG. 2 is basically the same as the operation of the transmission of FIG. 1; the dynamic neutral is obtained in this embodiment by adjusting the control wheel 57 to get the appropriate ratio of speeds between the pulleys 52 and 54. The control wheel 24 serves to completely release the belt to obtain a static neutral. The release of the belt eliminates the friction of the belt, thereby extending its life.

Figure 3:
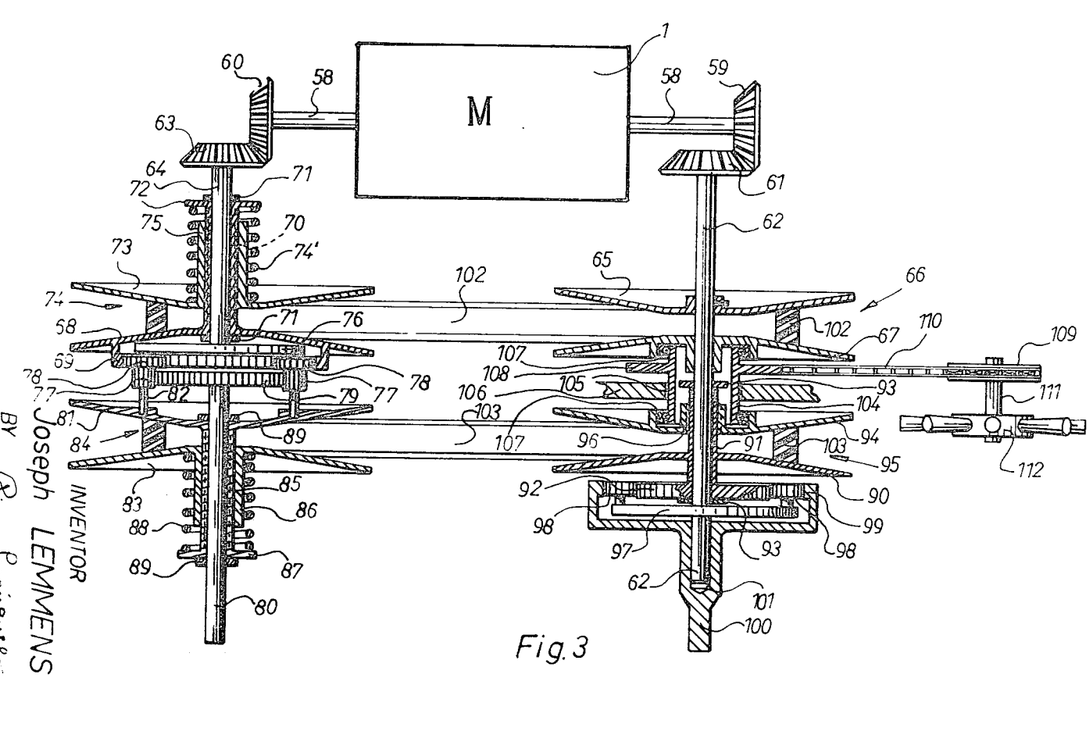
FIG. 3 is a cross-sectional view of still another embodiment of the invention forming a double variable-speed transmission with simultaneous neutrals.

FIG. 3 shows a dual transmission having simultaneous dynamic neutrals and which is of particular utility to provide an output shaft having doubled power. The motor M drives an input shaft 58 on which are fixed a pair of bevelled gears 59 and 60. Bevelled gear 59 meshes with another bevelled gear 61 fixed to a driven shaft 62. Similarly, bevelled gear 60 meshes with another bevelled gear 63 fixed to a driven shaft 64. A flange 65 of a variable pulley 66 is fixed to shaft 62 for rotation therewith. The other flange 67 of pulley 66 is slidably mounted on shaft 62 for longitudinal displacement relative thereto. A flange 68 having a ring gear 69 fixed thereto is freely mounted on the driven shaft 64. The freely mounted flange 68 has an extended hub portion 70 extending a fair distance along the driven shaft 64. The hub portion 70 has an axially restraining ring 71 at each end thereof, in order to keep the flange 68 in cooperative alignment with the flange 65. The extended hub portion 70 terminates at its free end into a circular flange 72.

A second flange 73 cooperates with the flange 68 to form a variable diameter pulley 74. The flange 73 has an extended hub portion 75 surrounding the hub portion 70 of the flange 68. The outside surface of the hub portion 70 has splines provided to cooperate with the splines inside the bore of the extended hub portion 75, such that the two flanges 68 and 73 are held for bodily rotation while allowed to slide longitudinally relative to each other. A compression spring 74' surrounds hub portion 75 and abuts flange 72 and flange 73 to urge the latter towards flange 68.

A planet carrier 76 holding the planet gears 77 is fixed on the driven shaft 64 for bodily rotation therewith. The planet gears 77 have an enlarged diameter portion 78 engaging the ring gear 69 and a reduced diameter portion engaging the sun gear 79.

A first output shaft 80 is fixed to the sun gear 79 for rotation therewith. A flange 81 is mounted on the first output shaft 80 for free rotation relative thereto. The spindles 82 carrying the planet gears 77 engage the flange 81 to cause rotation thereof. The flange 81 cooperates with a flange 83 to define another variable pulley 84. The flanges 81 and 83 are arranged one relative to the other the same way as flanges 68 and 73; that is, the flange 81 has an extended hub portion 85 having a splined outer surface and the flange 83 has an extended hub portion 86 having a splined bore, the splines of said extended hub portion 85 and 86 cooperating with each other to allow sliding of said flange 83 relative to flange 81 longitudinally of the output shaft 80. A compression spring 88 surrounds said extended hub portion and is in compression between a circular flange 87 and the outer surface of the flange 83 to urge flange 83 towards flange 81. One washer 89 is fixed to the output shaft 80 at each end of the extended hub portion 85 such as to axially restrain the flange 81 relative to the output shaft 80.

A flange 90 is mounted on the driven shaft 62 for free rotation relative thereto. The hub 91 of the flange 90 extends on both sides of the latter along the driven shaft 62. The outer end of the hub 91 is provided with or formed into a sun gear 92.

A washer 93 is fixed to the driven shaft 62 at each end of the extended hub 91 such as to axially restrain the flange 90 relative to the driven shaft 62. A flange 94 cooperates with the flange 90 to determine a variable pulley 95. The flange 94 has a hub portion 96 provided with a splined bore cooperating with matching splined on the outer surface of the extended hub portion 91.

A planet carrier 97 is fixed to the driven shaft 62 for rotation therewith. A pair of planet gears 98 are carried by the planet carrier 97 for rotation on their spindles and around the sun gear 92, as is well known. A ring gear 99 surrounds the planet gears 98 in meshing engagement therewith. The ring gear 99 is formed into or fixed to an output shaft 100 having a bore 101 adapted to receive the end of the driven shaft 62 for free rotation relative thereto. A pair of belts 102 and 103 connects the two pairs of pulleys 66, 74 and 84, 95. It should be noted that all these four pulleys have a variable width.

In order to control the two variable speed drives determined respectively by the above-mentioned two pairs of pulleys, there is provided an axially displaceable sleeve 104 threadedly received in a threaded bore 105 of a frame member 106, concentric with the driven shaft 62 carrying the pulleys 66 and 95.

A thrust bearing 107 is provided at each end of the sleeve 104 between the latter and the flanges 67 and 94 respectively. It can therefore be appreciated that axial displacement of the sleeve 104 will cause similar displacement of the flanges 67 and 94 without hindering the rotation of the latter. A sprocket 108 is either formed integrally with or attached to the sleeve 104. A sprocket 109 is associated to the sprocket 108 by means of a driving chain 110. The sprocket 109 is mounted on a spindle 111, which is operated by a control wheel 112.

FIG. 3 illustrates a compact assembly wherein the two output shafts rotate at equal but variable speeds and wherein motion is obtained with planet gears having two different diameters. The dual transmission with simultaneous dynamic neutral, as illustrated in FIG. 3, operates as follows. The rotation of the driven shaft is transmitted through the fixed flange 65 to the variable pulley 66 and by the belt 102 to the variable pulley 74, the flange 68 and the ring gear 69. The driven shaft 64 drives the planet carrier 76 and the planet gears 77 in planetary motion around the sun gear and ring gear axis. Rotation of the ring gear 69 and the planet gears 77 causes rotation of the sun gear 79 and the output shaft 80, except when the speeds of the variable pulley 74 and the driven shaft 64 are appropriate to arrive at a dynamic neutral or substantially zero speed of the sun gear 79. Hence, a first output is transmitted to the output shaft 80. The spindles 82 of the planet gears 77 being fixed to the flange 81, rotation of the planet gears 77 results in rotation of the pulley 84, through belt 103 of the pulley 95 and the sun gear 92 through the extended hub 91. The driven shaft 62 rotates the planet carrier 97 and the planet gears 98 carried thereby. The rotation of the sun gear 92 and the planet gears 98 ordinarily causes rotation of the ring gear 99 and the second output shaft 100.

Variation of the speed of the output shafts 80 and 100 is obtained by rotation of the control wheel 112, resulting in rotation of the sleeve 104 and its displacement up or down by action of the screw threads of threaded sleeve in the threaded bore 105. Axial displacement of the sleeve 104 pushes the assembly of movable flanges 67 and 94 in one or the other direction along shaft 62, resulting in inverse speed ratios for the belts 102 and 103 and, finally, in equal output speeds for the output shafts 80 and 100.

Figure 4:
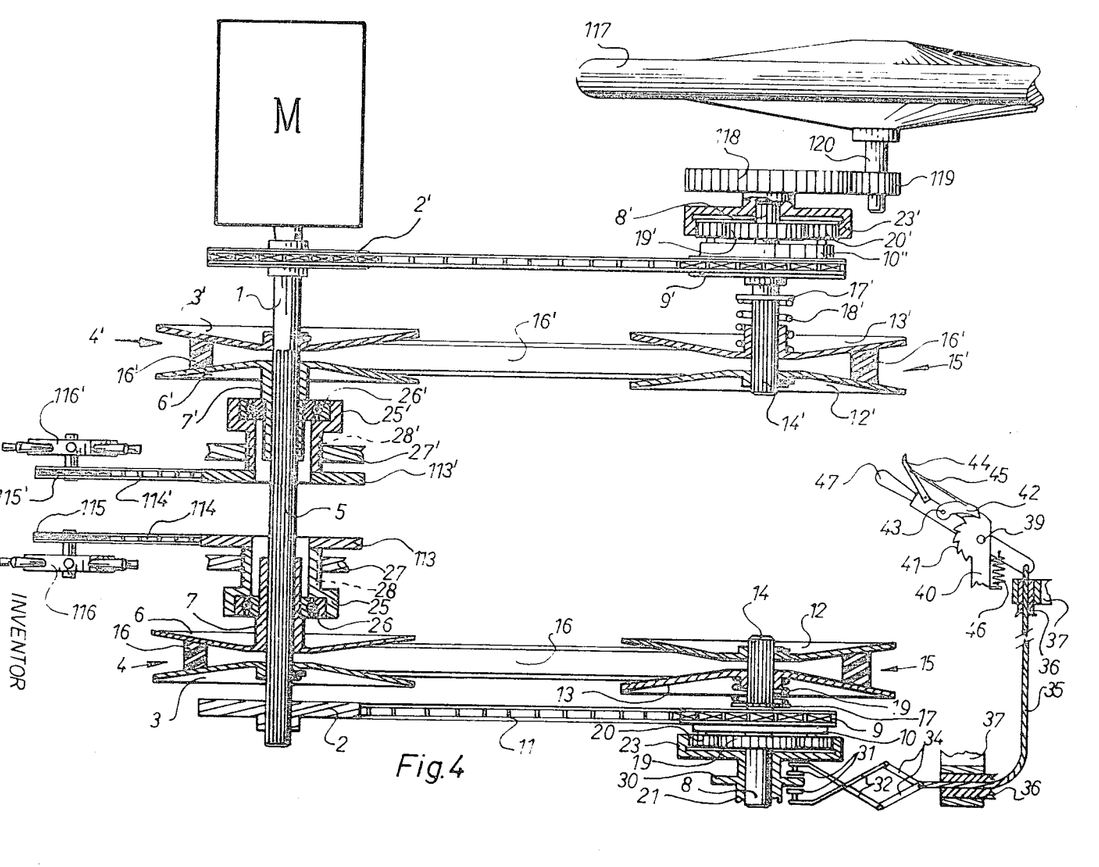
FIG. 4 is another embodiment of the invention showing a double transmission having a dynamic neutral and a flywheel.

The embodiment of FIG. 4 will now be described in detail and the same reference numerals will indicate the same parts as in FIG. 1. As can be seen, the lower part of FIG. 4 is the same exactly, except that the splined portion 5 of the shaft 1 extends in cooperation with the sprocket wheel 2; the control wheel 24 is replaced by a sprocket wheel 113 cooperating with a chain 114 and a sprocket wheel 115 actuated by a control wheel 116. The sprocket wheel 113 is either fixed to the sleeve 25 or integral therewith.

The mechanism at the top of FIG. 4 is a mirror image of the mechanism at the bottom of the same Figure, except for the addition of a flywheel 117. Therefore, all the elements at the top of FIG. 4 which have their counterparts at the bottom of the Figure, are identified by the same reference numerals with a prime ('). The mechanism at the top of FIG. 4, hereinafter called the flywheel operating mechanism, comprises a gear 118 fixed to the ring gear 23' for rotation therewith and a pinion 119 meshing with gear 118 and fixed on the spindle 120 of the flywheel 117 to rotate the latter upon rotation of the ring gear 23'.

The motor M rotates at constant or variable speed and so is the input shaft 1 and the sprocket wheels 2, 9, 2', and 9'. The control wheel 116' serves to vary the angular speed of the pulley 15' and thereby of the flywheel 117, hence adjusting its storage of energy. The control wheel 116 serves to vary the speed of the output shaft connected to the ring gear 23.

When the motor starts, both transmissions are adjusted at the dynamic neutral. In accordance with the requirements, energy can be transmitted either to output shaft 8 or to flywheel 117 or simultaneously to both by proper adjustments of control wheels 116, 116'. The energy stored in flywheel 117 is automatically transmitted to output shaft 8 upon a decrease in the speed of shaft 8 due an increase in the load or when the ratio of shafts 8 and 5 is increased by varying control wheel 116. To brake output shaft 8, control wheel 116 is progressively adjusted to dynamic neutral; the slowing down would tend to rotate the motor faster, but the latter is retained by the transmission connected to the flywheel. Thus, energy derived from braking is accumulated in the flywheel. To stop the mechanism, motor M is stopped and the flywheel energy is expended in the load by adjusting control wheel 116' to dynamic neutral. Alternatively, motor M can be used as a brake for the flywheel.

Figure 5:
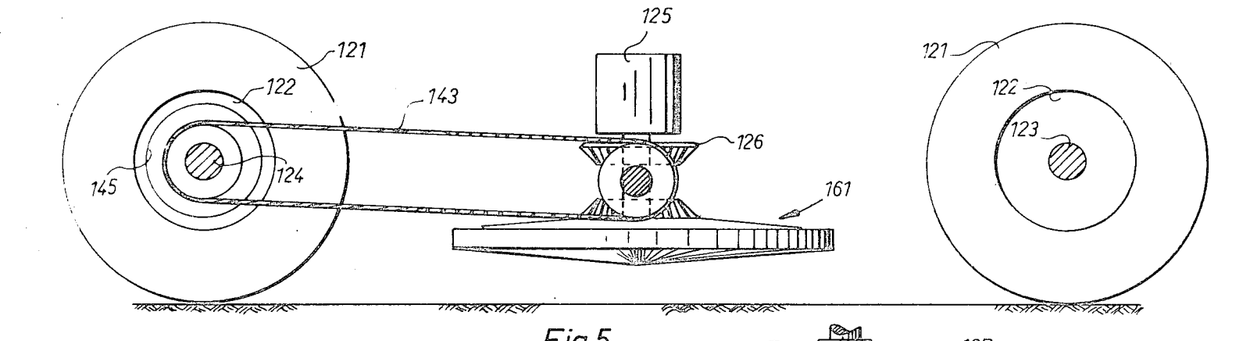
FIG. 5 is a cross-sectional view, along line 5—5 in FIG. 7, of a flywheel drive mounted on an engineless vehicle.
Figure 6:
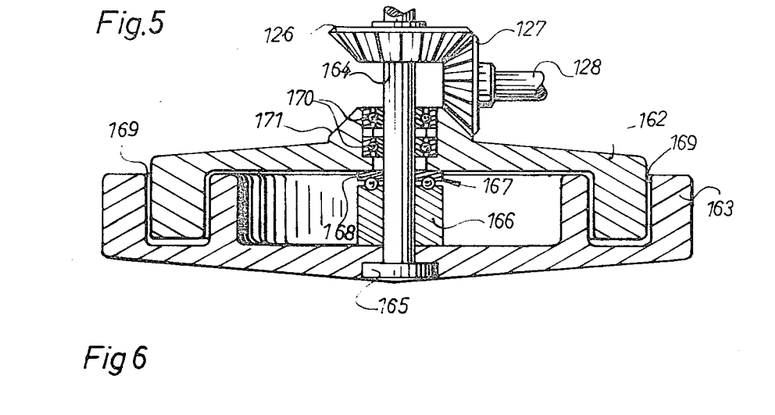
FIG. 6 is a cross-sectional view of a pair of dynamically balanced contrarotating flywheels.
Figure 7:
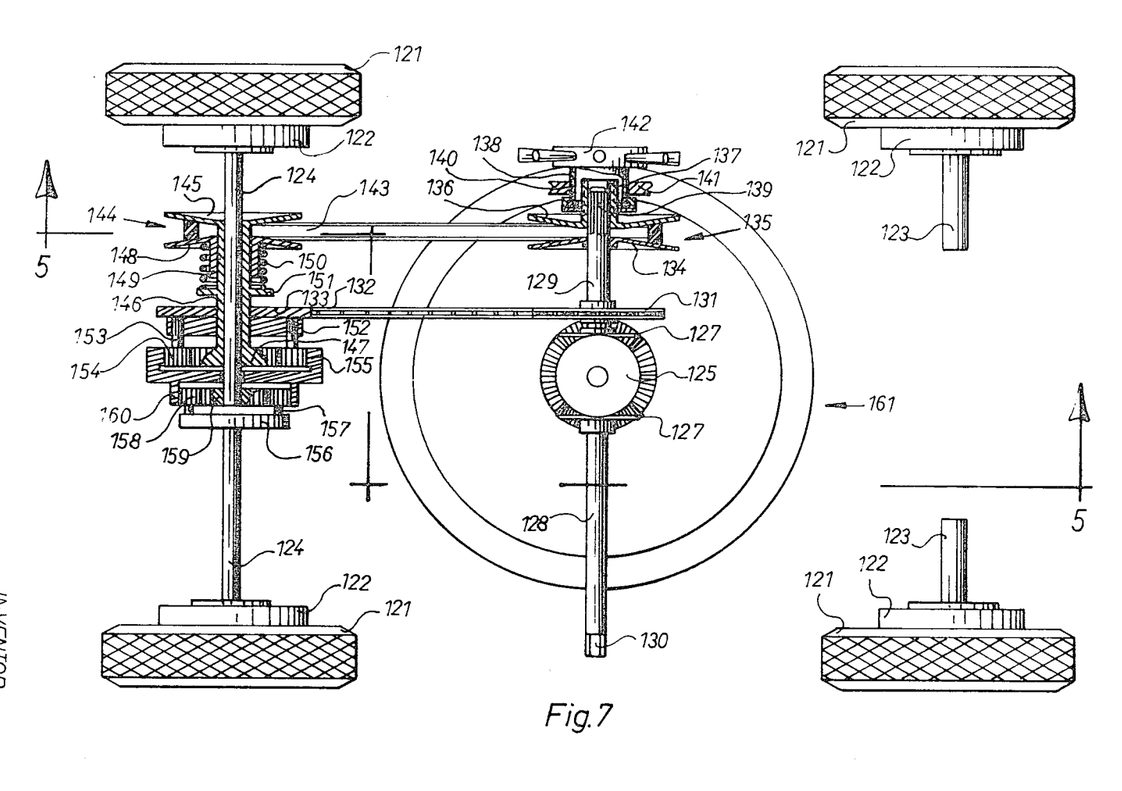
FIG. 7 is a plan view, partly in cross section, of one embodiment of a variable-speed transmission in driving connection with the roadwheels of a vehicle.

FIGS. 5, 6, and 7 illustrate a practical application of the flywheel to a vehicle. The roadwheels 121 of the vehicle are mounted on hubs 122 fixed to the front and rear axles 123 and 124 respectively. An electric motor 125 drives a bevelled gear 126 meshing with a pair of axially aligned input bevelled gears 127 mounted on input shafts 128 and 129. The free end of the input shaft 128 forms a socket 130. A sprocket wheel 131 is fixed to input shaft 129 for rotation therewith. The sprocket wheel 131 is operatively connected by a chain 132 to a sprocket wheel 133 mounted for free rotation around the rear axle 124 of the vehicle. A flange 134 of a pulley 135 is fixed to the input shaft 129 for rotation therewith. The pulley 135 includes a second flange 136 having an extended hub 137. The latter has a bore provided with splines 138 arranged to cooperate with the splined portion 139 of the input shaft 129. The outside surface of the extended hub 137 is provided with screw threads cooperatively engaging a threaded bore 140 of a frame member 141. The free end of the extended hub 137 is provided with a control wheel 142 such that rotation of the latter axially moves the flange 136 to vary the spacing between flanges 134 and 136.

A belt 143 drivingly connects the variable pulley 135 to a further variable pulley 144. The latter comprises a flange 145 having an extended hub 146 terminating into a sun gear 147. The flange 145 including the sun gear 147, is rotatably mounted on rear axle 124. The variable pulley 144 includes a second flange 148 having an extended hub 149 slidably mounted on the extended hub 146 longitudinally thereof.

A spring 150 is coiled around the extended hub 149 in compression between a circular flange 151 and the outer surface of the flange 148. The wheel sprocket 133 has a planet carrier 152 fixed thereto. The latter has a pair of spindles 153 extending therefrom and planet gears 154 fixed on said spindles 153 in meshing engagement with the sun gear 147 and a ring gear 155. The free end of one rear axle 124 has a planet carrier 156 fixed thereon. The latter carries a pair of spindles 157 on which are rotatably mounted planet gears 158 in meshing engagement with a sun gear 159 fixed to the free end of the other rear axle 124 and with a ring gear 160 integral with the ring gear 155.

The electric motor 125 and the input shaft 128 serve to store energy in the flywheel 161 to be discussed in detail later. It has to be noted here that the vehicle is of the unpowered type, that is it has no engine. The vehicle is operated by the stored energy of the flywheel 161. When the flywheel 161 has been given the desired level of kinetic energy, the vehicle can be driven either forward or backward by operation of the control wheel 142, resulting in the transmission of energy through the input shaft 129, the belt 143 and the chain 132, to the pulley 144 and the sprocket wheel 133. The pulley 144 and the sprocket wheel 133 drive respectively the sun gear 147 and the planet gears 154, resulting in rotation of the ring gear 135 at a speed dependent on the relative speed of said pulley and sprocket wheel. Rotation of ring gear 155 causes the rotation of planet gears 158 and of the sun gear 159 in the same angular direction, thereby resulting in rotation of the rear roadwheels 121.

As we have seen for the previous figures, the control wheel 142 varies the spacing contrarotating the flanges 134 and 136 of the variable diameter pulley 135, resulting in a different speed ratio between pulleys 135 and 144 and a variation of the speed of the sun gear 147.

The flywheel 161, as best seen in FIG. 6, is a dual flywheel comprising two contrarotating discs 162 and 163 of equal weights and dynamic balance, in order to avoid precession and the resulting unbalance. The flywheel 163 is mounted directly on the output shaft 164 of the electric motor 125 or on an extension thereof. The free end of the output shaft 164 terminates into an enlarged head 165 adapted to retain the two flywheel discs 162 and 163 with the latter fixed to the shaft 164 for rotation therewith. A sleeve 166 is disposed concentric with the shaft 164 and is constructed and arranged to form a bearing 167 with the annular element 168. The flywheel disc 162 is shaped to freely engage in a circular recess 169 in the flywheel disc 163. Two sets of bearings 170 are disposed around the shaft 164 for guiding rotation of the flywheel disc 162. The central portion of the latter around the shaft 164 is formed into a bevelled gear 171. Obviously, the latter could be a separate element fixed to the flywheel disc 162 for bodily movement therewith.

The control wheel 142 controls the amount of energy on the flywheel 161 or the rear axle 124, as the case may be.

It is also contemplated to use flyweights to vary the spacing between the cooperating flanges of any pulley, thereby varying the diameters of such pulleys and the speed ratios.

It must also be pointed out that the variable diameter pulleys and the belts may be replaced by hydraulic or electric converters.

It is also noted that the planetary gear trains shown and described could be replaced by other types of differential gear trains.

What I claim is:

1. A variable-speed transmission comprising in combination an input shaft, a first differential gear train having a first gear means, a second gear means and a third gear means, a first proportional speed drive operatively connected between said input shaft and said first gear means to rotate the same, a first variable speed drive operatively connected between said input shaft and the second gear means of said first differential gear train, an output shaft fixed to the third gear means of said differential gear train, first control means adapted to vary the speed of said first variable speed drive, a flywheel, an additional shaft operatively connected to said flywheel, a second differential gear train having a first gear means, a second gear means and a third gear means, a second proportional speed drive operatively connected between said input shaft and said first gear means of said second differential gear train to rotate the latter, a second variable speed drive operatively connected between said input shaft and the second gear means of said second differential gear train, said additional shaft fixed to the third gear means of said second differential gear train and second control means adapted to vary the speed of said second variable-speed drive.

2. A variable-speed transmission as claimed in claim 1, wherein said first, second and third gear means of said second differential gear train consist of planet gears, a sun gear and a ring gear, respectively, of a planetary gear train.

3. A variable-speed transmission as claimed in claim 1, wherein said first, second and third gear means of said first differential gear train consist of planet gears, a sun gear and a ring gear, respectively, of a planetary gear train.

4. A variable-speed transmission as claimed in claim 2, wherein said first, second and third gear means of said second differential gear train consist of planet gears, a sun gear and a ring gear, respectively, of a planetary gear train.

5. A variable-speed transmission as claimed in claim 1, wherein said first variable speed drive comprises a first variable diameter pulley mounted on the input shaft and a second variable diameter pulley mounted in driving connection with said second gear means of said first differential gear train, a belt operatively associated with said first and second variable diameter pulleys to transmit the rotation of said first variable diameter pulley to said second variable diameter pulley, said first variable diameter pulley being defined by a pair of relatively displaceable coaxial flanges, one flange secured to said input shaft, the other flange having a hub axially displaceable, but nonrotatable, on said input shaft, said first control means including a sleeve surrounding and coaxial with said input shaft attached to the hub of said other flange for axial movement therewith and for relative rotation, and means for adjustably axially displacing said sleeve to adjustably vary the axial position of said one flange relative to said one flange.

6. A variable-speed transmission as claimed in claim 5, wherein said means to adjustably axially displace said sleeve include external threads formed on said sleeve, a stationary member having an inwardly threaded bore threadedly receiving said sleeve and coaxial with said input shaft, and a control wheel formed on said sleeve to rotate the same.

* * * * *